US011899654B2

(12) United States Patent
Spiegelman

(10) Patent No.: US 11,899,654 B2
(45) Date of Patent: Feb. 13, 2024

(54) LINEAR BYZANTINE AGREEMENT

(71) Applicant: VMware LLC, Palo Alto, CA (US)

(72) Inventor: Alexander Spiegelman, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 534 days.

(21) Appl. No.: 17/028,681

(22) Filed: Sep. 22, 2020

(65) Prior Publication Data
US 2021/0256011 A1 Aug. 19, 2021

Related U.S. Application Data

(60) Provisional application No. 62/976,960, filed on Feb. 14, 2020.

(51) Int. Cl.
*G06F 16/23* (2019.01)
*G06F 7/58* (2006.01)
*G06Q 30/018* (2023.01)

(52) U.S. Cl.
CPC .......... *G06F 16/2379* (2019.01); *G06F 7/582* (2013.01); *G06Q 30/0185* (2013.01); *G06Q 2230/00* (2013.01)

(58) Field of Classification Search
CPC . G06F 16/2379; G06F 7/582; G06Q 30/0185; G06Q 2230/00
See application file for complete search history.

(56) References Cited

U.S. PATENT DOCUMENTS

| 2021/0099294 A1* | 4/2021 | Guo ................. G06Q 20/38215 |
| 2022/0021732 A1* | 1/2022 | Zapfel ................. H04L 67/1034 |

OTHER PUBLICATIONS

Abraham et al., Efficient Synchronous Byzantine Consensus, Sep. 14, 2017, arxiv.org, all pages (Year: 2017).*

* cited by examiner

*Primary Examiner* — Tamara T Kyle
*Assistant Examiner* — Lahcen Ennaji
(74) *Attorney, Agent, or Firm* — Quarles & Brady LLP

(57) ABSTRACT

An optimistic byzantine agreement protocol (the protocol) first tries to reach agreement via an efficient deterministic algorithm (synchronous protocol) that relies on synchrony for termination. If an agreement is not reached (e.g., due to asynchrony), the protocol uses a randomized asynchronous algorithm (asynchronous protocol) for fallback. Although randomized asynchronous algorithms are considered to be costly, the rationale here is to bound communication in non-synchronous runs after an equivalent cost has already paid.

20 Claims, 15 Drawing Sheets

——————— (view instance) ———————
*A linear LBV instance parametrized with sq and leader: API for a party $p_i$.*

Local variables initialization:
$S_{key} = S_{lock} = S_{commit} = \{\}$
keyProof, lockProof, commitProof $\in (\mathbb{V} \times \{0,1\}^*) \cup \{\bot\}$, initially $\bot$
active ← true ; done ← false 1: upon wedgeView(sq, leader) invocation do   (FIGs. 6 and 9)
2:   active ← false
3:   return (keyProof, lockProof, commitProof)

4: upon startView(sq, leader) invocation do
5:   start processing received messages associated with sq and leader
6:   if leader = $p_i$ then
7:     /*first step*/
8:     send "preKeyStep, sq, leader, VALUE, KEY" to all parties
9:     wait until $|S_{key}| = n - t$
10:    $v_k$ ← threshold-sign($S_{key}$)  ~ 302a      } 302
11:    send "KeyStep, sq, leader, VALUE, $v_k$" to all parties
12:    /*second step*/
13:    wait until $|S_{lock}| = n - t$
14:    $v_l$ ← threshold-sign($S_{lock}$)  ~ 304a      } 304
15:    send "LockStep, sq, leader, VALUE, $v_l$" to all parties
16:    /*third step*/
17:    wait until $|S_{commit}| = n - t$
18:    $v_c$ ← threshold-sign($S_{commit}$)  ~ 306a    } 306
19:    /*broadcast the commit*/
20:    send "COMMIT, sq, leader, VALUE, $v_c$" to all parties  ~ 308
21:    wait for done = true
22:    return (keyProof, lockProof, commitProof)  ~ 310 set at line 28, FIG. 4
          (set when leader sends COMMIT)

FIG. 3

A linear LBV instance parametrized with $sq$ and $leader: p_i$'s message handlers.

402
1: upon receiving "preKeyStep, $sq, leader, value, key$" from $leader$ do
2:   if $active \land (LOCK = \bot \lor key.sq \geq LOCK)$ then     ▷ key is up-to-date 402a
3:     if $key = \bot \lor threshold\text{-}validate_i(\text{preKeyStep}, key.sq, LEADER\{key.sq\}, value), key.proof)$ then   ▷ key is valid
4:       $\rho_k \leftarrow share\text{-}sign_i(\langle \text{preKeyStep}, sq, leader, value \rangle)$
5:       send "keyShare, $sq, leader, \rho_k$" to $leader$ 404
6: upon receiving "keyShare, $sq, leader, \rho_k$" from party $p_j$ for the first time do
7:   if $leader = p_i \land share\text{-}validate_i(\langle \text{preKeyStep}, sq, leader, VALUE \rangle, p_j, \rho_k)$ then   ▷ $\rho_k$ is $p_j$'s valid key share 404a
8:     $S_{key} \leftarrow S_{key} \cup \rho_k$ 9: upon receiving "KeyStep, $sq, leader, value, v_k$" from $leader$ do
10:   if $active \land threshold\text{-}validate_i(\langle \text{preKeyStep}, sq, leader, value \rangle, v_k)$ then
11:     $keyProof \leftarrow \langle value, v_k \rangle$
12:     $\rho_l \leftarrow share\text{-}sign_i(\langle \text{KeyStep}, sq, leader, value \rangle)$
13:     send "lockShare, $sq, leader, \rho_l$" to $leader$ 406
14: upon receiving "lockShare, $sq, leader, \rho_l$" from party $p_j$ for the first time do
15:   if $leader = p_i \land share\text{-}validate_i(\langle \text{KeyStep}, sq, leader, VALUE \rangle, p_j, \rho_l)$ then
16:     $S_{lock} \leftarrow S_{lock} \cup \rho_l$ 406a
17: upon receiving "lockStep, $sq, leader, value, v_l$" from $leader$ do
18:   if $active \land threshold\text{-}validate_i(\langle \text{KeyStep}, sq, leader, value \rangle, v_l)$ then
19:     $lockProof \leftarrow \langle value, v_l \rangle$
20:     $\rho_c \leftarrow share\text{-}sign_i(\langle \text{lockStep}, sq, leader, value \rangle)$
21:     send "commitShare, $sq, leader, \rho_c$" to $leader$ 408
22: upon receiving "commitShare, $sq, leader, \rho_c$" from party $p_j$ for the first time do
23:   if $leader = p_i \land share\text{-}validate_i(\langle \text{lockStep}, sq, leader, VALUE \rangle, p_j, \rho_c)$ then
24:     $S_{commit} \leftarrow S_{commit} \cup \rho_c$ 25: upon receiving "commit, $sq, leader, value, v_c$" from $leader$ do
26:   if $active \land threshold\text{-}validate_i(\langle \text{lockStep}, sq, leader, value \rangle, v_c)$ then
27:     $commitProof \leftarrow \langle value, v_c \rangle$
28:     $done \leftarrow true$

FIG. 4

Adaptive synchronous protocol. Procedure for a party $p_i$.

1: upon Synch-propose($v_i$) do
2:     VALUE ← $v_i$
3:     tryOptimistic()
4: procedure TRYOPTIMISTIC()
5:     trySynchrony(1, $p_1$, 7)
6:     for $j$ ← 2 to $n$ do
7:        if $i \neq j$ then
8:           trySynchrony($j$, $p_j$, 9)
9:        else if COMMIT = ⊥ then
10:           send "KEYREQUEST" to all parties
11:           wait for $2\Delta$ time
12:           trySynchrony($j$, $p_j$, 7)

13: procedure TRYSYNCHRONY($sq, leader, T$)
14:     invoke startView($sq, leader$)    ▷ non-blocking invocation
15:     wait for $T$ time
16:     ($keyProof, lockProof, commitProof$) ← wedgeView($sq, leader$)
17:     updateState($sq, leader, keyProof, lockProof, commitProof$)   (FIG. 7)

18: upon receiving "KEYREQUEST" from party $p_k$ for the first time do
19:     send "KEYREPLY, KEY, VALUE" to party $p_k$ 20: upon receiving "KEYREPLY, *key, value*" do
21:     check&updateKey(*key, value*)   (FIG. 7)

FIG. 6

Auxiliary procedures to update local state.

```
1:  procedure UPDATESTATE(sq, leader, keyProof, lockProof, commitProof)
2:      LEADERS[sq] ← leader
3:      if keyProof ≠ ⊥ then
4:          KEY ← ⟨sq, keyProof.proof⟩
5:          VALUE ← keyProof.val
6:      if lockProof ≠ ⊥ then
7:          LOCK ← sq
8:      if commitProof ≠ ⊥ then
9:          COMMIT ← ⟨commitProof.val, sq, commitProof.proof⟩
10:         decide COMMIT.val 11: procedure CHECK&UPDATEKEY(key, value)
12:     if (KEY = ⊥ ∨ key.sq > KEY.sq) then
13:         if threshold-validate({PREKEYSTEP, key.sq, LEADER[key.sq], value}, key.proof) then
14:             KEY ← key
15:             VALUE ← value 16: procedure CHECK&UPDATECOMMIT(commit)
17:     if COMMIT = ⊥ then
18:         if threshold-validate({LOCKSTEP, commit.sq, LEADER[commit.sq], commit.val}, commit.proof) then
19:             COMMIT ← commit
20:             decide COMMIT.val
```

FIG. 7

Asynchronous fallback: Protocol for a party $p_i$.

```
 1: upon Asynch-propose($v_i$) do
 2:     VALUE ← $v_i$
 3:     fallback(1)

4: procedure FALLBACK($sq_{init}$)
 5:     RRleader ← 1
 6:     sq ← $sq_{init}$
 7:     while true do
 8:         wave(sq)
 9:         exchangeState(sq)
10:         help&tryHalting(sq)
11:         trySynchrony(sq + 1, RRleader, 8Δ)
12:         exchangeState(sq+1)
13:         help&tryHalting(sq + 1)
14:         RRleader ← RRleader + 1 mod |Π|
15:         sq ← sq + 2

16: upon startView(sq, $p_j$) returns do
17:     send "YOUR-VIEW-DONE, sq" to party $p_j$ 18: procedure WAVE(sq)
19:     for all $p_j = p_1, ..., p_n$ do
20:         invoke startView(sq, $p_j$)                  ▷ non-blocking invocation
                                                         ▷ blocking
21:     barrier-sync(sq)
22:     leader ← elect(sq)
23:     (keyProof, lockProof, commitProof) ← wedgeView(sq, leader)
24:     updateState(sq, leader, keyProof, lockProof, commitProof) (FIG. 7)

25: upon receiving n − t "YOUR-VIEW-DONE, sq" messages do
26:     invoke barrier-ready(sq)   ▷ note that n − t parties must invoke
                                     it for barrier-sync(sq) to return 27: procedure EXCHANGESTATE(sq)
28:     send "EXCHANGE, sq, KEY, VALUE, COMMIT" to all parties
29:     wait for n − t "EXCHANGE, sq, *, *" messages from different parties 30: upon receiving "EXCHANGE, sq, key, value, commit" do
31:     check&updateKey(key, value)
32:     check&updateCommit(commit)
```

FIG. 9

Barrier synchronization and Leader-election: protocol for a party $p_i$.

Local variables for Barrier synchronization:
1: $S_{barrier} \leftarrow \{\}$; $READY \leftarrow false$ 2: procedure BARRIER-SYNC($sq$)
3:    wait until $READY = true$ 4: procedure BARRIER-READY($sq$)
5:    $\rho \leftarrow share\text{-}sign_i((\text{SHAREREADY}, sq))$
6:    send "SHAREREADY, $sq, \rho$" to all parties 7: upon receiving "SHAREREADY, $sq, \rho$" from a party $p_j$ do
8:    if $share\text{-}validate((\text{SHAREREADY}, sq), p_j, \rho)$ then
9:       $S_{barrier} \leftarrow S_{barrier} \cup \{\rho\}$
10:       if $|S_{barrier}| = n - t$ then
11:          $v \leftarrow threshold\text{-}sign(S_{barrierReady})$
12:          send "BARRIERREADY, $sq, v$" to all parties 13: upon receiving "BARRIERREADY, $sq, v$" do
14:    if $threshold\text{-}validate((\text{BARRIERREADY}, sq), v)$ then
15:       send "BARRIERREADY, $sq, v$" to all parties
16:       $READY \leftarrow true$

Local variables for Leader election:
17: $S_{coin} \leftarrow \{\}$

18: procedure ELECT($sq$)
19:    $\rho \leftarrow share\text{-}sign_i(sq)$
20:    send "COINSHARE, $sq, \rho$" to all parties
21:    wait until $|S_{coin}| = t + 1$
22:    $v \leftarrow threshold\text{-}sign(S_{coin})$
23:    return $p_j$ s.t. $j = Hash(v) \bmod |\Pi|$ 24: upon receiving "COINSHARE, $sq, \rho$" from $p_j$ do
25:    if $share\text{-}validate(sq, p_j, \rho)$ then
26:       $S_{coin} \leftarrow S_{coin} \cup \{\rho\}$

FIG. 10

```
Optimistic byzantine agreement: protocol for a party p_i.

1: upon Optimistic-propose(v_i) do
2:    VALUE ← v_i
3:    tryOptimistic()        // run synchronous protocol //
4:    help&tryHalting(n + 1) ----→ Blocking invocation
5:    fallback(n + 2)         // run asynchronous protocol //
```

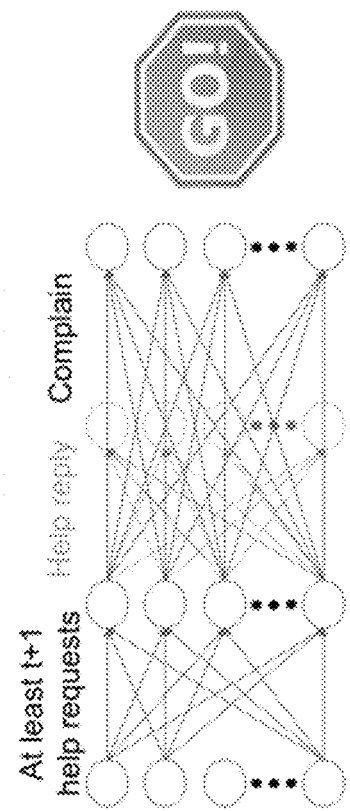

FIG. 14

Help and try halting: Procedure for a party $p_i$.

Local variables initialization:
$S_{help} = \{\}, HALT \leftarrow true$

1: procedure help&tryHalting($sq$)
2:  if $COMMIT = \perp$ then
3:   $\rho \leftarrow $ share-sign$_i(\langle \text{HELPREQUEST}, sq \rangle)$
4:   send "HELPREQUEST, $sq, \rho$" to all parties  ~1402
5:  wait until $HALT = false$ 6: upon receiving "HELPREPLY, $sq, commit$" do
7:  check&updateCommit($commit$)   (FIG. 7)

8: upon receiving "HELPREQUEST, $sq, \rho$" from a party $p_j$ do
9:  if share-validate($\langle \text{HELPREQUEST}, sq \rangle, p_j, \rho$) then
10:   $S_{help} \leftarrow S_{help} \cup \{\rho\}$
11:   send "HELPREPLY, $sq, COMMIT$ to $p_j$  ~1404
12:   if $|S_{help}| = t + 1$ then
13:    $v \leftarrow $ threshold-sign($S_{help}$)
14:    send "COMPLAIN, $sq, v$" to all parties  ~1406

15: upon receiving "COMPLAIN, $sq, v$" do
16:  if threshold-validate($\langle \text{HELPREQUEST}, sq \rangle, v$) then
17:   send "COMPLAIN, $sq, v$" to all parties  ~1408
18:   $HALT \leftarrow false$

1400

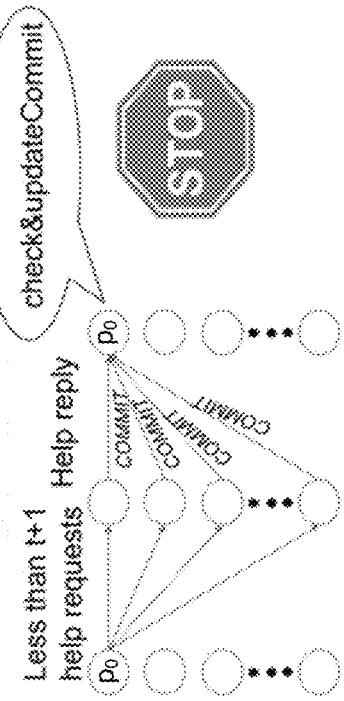

LINEAR BYZANTINE AGREEMENT

CROSS REFERENCE TO RELATED APPLICATIONS

Pursuant to 35 U.S.C. § 119(e), this application is entitled to and claims the benefit of the filing date of U.S. Provisional App. No. 62/976,960 filed Feb. 14, 2020, the content of which is incorporated herein by reference in its entirety for all purposes.

BACKGROUND

The demand for scalable byzantine agreement state machine replication (SMR) systems has resulted in a need for a byzantine agreement protocol with linear communication cost. The byzantine agreement problem addresses the question of how to ensure that multiple entities, which are separated by distance, are in absolute full agreement before an action is taken. In other words, how can individual parties find a way to guarantee full consensus?

The common approach is to design a deterministic protocol based on the "eventually synchronous" communication model which is optimized to reduce the communication cost after a global stabilization time (GST). This approach, however, is not suitable for scalable SMR systems because it can result in unbounded communications during asynchronous periods.

A communication is "synchronous" if there is some maximum value (upper bound) on the time between when a party (node) sends a message and when you can be certain that the receiving party hears the message. In an asynchronous communication, messages can take arbitrarily long to reach the parties and each party can take an arbitrary amount of time to respond. The amount of time includes "infinity" meaning that it takes forever for some event to occur. The asynchronous model is important because it more accurately captures real-world implementations where parties on a network can fail (e.g., compromised by an attacker, system crash, etc.). In a partially synchronous system, the view is that messages will eventually reach a party.

With the emergence of Blockchain, designing a scalable geo-replicated byzantine tolerant state machine replication (SMR) system that supports hundreds of computing nodes (parties) deployed across multiple distant physical locations is becoming one of the challenging problems in distributed computing. The core of every byzantine SMR system is the byzantine agreement problem, which is an intensively studied topic. The bottleneck in geo-replicated scalable SMR systems is network communication, and thus a substantial effort in recent years is invested in the search for an adequate byzantine agreement protocol.

The 1985 publication of Impossibility of Distributed Consensus with One Faulty Process in the Journal of the Association for Computing Machinery (JACM) by Fischer, Lynch, and Paterson states that deterministic asynchronous agreement protocols are impossible. Since that publication, most SMR solutions use an "eventually synchronous" communication model and provide safety during asynchronous periods but are able to guarantee progress only after the global stabilization time (GST), which is an assumed maximum (worst case) amount of time it takes for a message to reach a recipient.

Most state-of-the-art practical byzantine agreement protocols focus on reducing communication cost after GST, while putting up with a potentially unbounded cost prior to GST. For example, protocols such as Zyzzyva and Simplified Byzantine Fault Tolerance (SBFT) use threshold signatures and collectors to reduce the quadratic cost induced by the all-to-all communication in each view of the Practical Byzantine Fault Tolerance (PBFT) protocol. Other protocols use a linear view-change mechanism or synchronize parties between views with a linear cost after GST in failure-free runs. However, these algorithms do not bound the number of views executed prior to GST, and thus none of them bound their communication costs in the worst case scenario of asynchronous operation.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 3 and 4 show procedures for operating a linear LBV in accordance with the present disclosure.

FIGS. 6 and 7 show procedures for operating a synchronous protocol in accordance with the present disclosure.

FIGS. 9 and 10 procedures for operating an asynchronous protocol in accordance with the present disclosure.

FIG. 14 shows a halting procedure in accordance with the present disclosure.

FIGS. 15A and 15B illustrate scenarios of the halting procedure.

DETAILED DESCRIPTION

Figure 1:
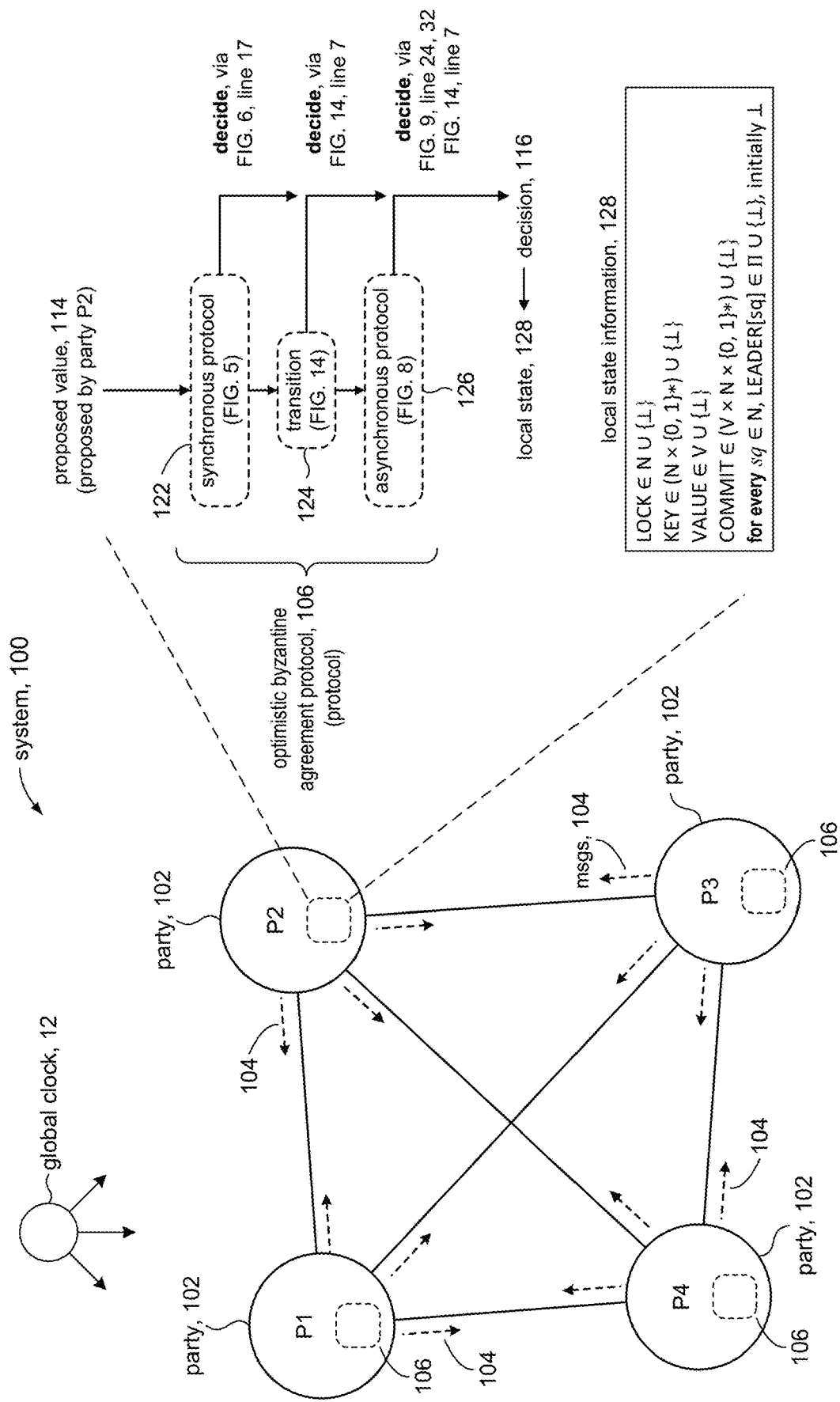
FIG. 1 shows a system in accordance with the present disclosure.

So called "eventually synchronous" communication models capture arbitrarily long asynchronous periods that are followed by "long enough" synchronous periods. Accordingly, algorithms in this model are designed to provide progress with a small communication cost during synchronous periods, but might be forced to pay unbounded cost to tolerate the asynchronous periods. The present disclosure provides a novel approach that forgoes the assumptions made in eventually synchronous communication models.

Instead of paying an unbounded communication cost while waiting for synchrony, the present disclosure provides an alternative approach that hopes for the best (synchrony) but prepares for the worst (asynchrony). The present disclosure provides an optimistic byzantine agreement protocol (referred to herein as "optimistic protocol") that first tries to reach agreement via an efficient deterministic algorithm that relies on synchrony for termination, and then, if an agreement was not reached due to asynchrony, the protocol uses an asynchronous algorithm for fallback.

An optimistic protocol in accordance with the present disclosure can adapt to network conditions and failures to guarantee termination with an optimal bounded communication cost under all scenarios. To this end, an optimistic byzantine agreement protocol in accordance with the present disclosure first runs an efficient synchronous algorithm that guarantees termination in synchronous runs with an optimal communication cost. Then, in case the run is not synchronous, the optimistic protocol uses an asynchronous algorithm for fallback. The idea behind this approach is to move or otherwise transition to the asynchronous fallback only after having paid an equivalent communication cost to that of the fallback algorithm during the synchronous run, after which point there is no benefit in waiting for synchrony in a hope for a low cost.

An optimistic byzantine agreement protocol in accordance with the present disclosure can realize an asymptotically (and hence bounded) optimal communication cost under all network conditions and failure scenarios. The optimistic protocol guarantees termination in all synchronous runs with a communication cost of $O(ft+t)$; and in runs that are asynchronous or have long synchrony, the optimistic protocol provides termination with probability 1 with an expected communication cost of $O(t^2)$, where the protocol models for t failures among n parties with f actual failed (corrupted) parties. The optimistic protocol combines a synchronous component with an asynchronous fallback component, where the synchronous component the protocol uses an optimal synchronous algorithm and for the fallback component the protocol uses an optimal asynchronous byzantine agreement algorithm.

An aspect of an optimistic byzantine agreement protocol in accordance with the present disclosure is to make sure that parties do not move to the more expensive asynchronous part (fallback) unless necessary for termination, while not paying more than $O(ft+t)$ in communication cost during synchronous runs. The challenge here is twofold: first, parties cannot always distinguish between synchronous and asynchronous runs; an asynchronous run can be truly asynchronous (e.g., due to failed or compromised node) or is synchronous but with a very long delay. Second, the parties cannot distinguish between honest parties that complain that they did not decide (due to asynchrony) in the first part and byzantine parties that complain because they wish to increase the communication cost by moving to the asynchronous fallback. The notion of a "complaint" is discussed below. To deal with this challenge, the present disclosure provides a HELP&TRYHALTING procedure in which parties try to avoid the fallback part by helping complaining parties learn the decision value and move to the fallback only when the number of complaints indicates that the run is not synchronous. This way, each byzantine party in a synchronous run cannot increase the communication cost by more than $O(n) \cong O(t)$, where n is the total number of parties.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 shows a system 100 that is based on a byzantine message passing peer to peer model with a set Π of n parties 102 (computing systems) and a computationally bounded adversary 14 that corrupts up to $t<n/3$ of them. The adversary 14 can be one of the parties 102 or a computing system separate from the parties. Parties corrupted by adversary 14 are called "byzantine" parties and may arbitrarily deviate from the optimistic protocol of the present disclosure. Other parties are referred to as "honest."

The Agreement Problem

System 100 performs the Agreement problem, where each party proposes a value 114 from some domain V and outputs a decision 116 in accordance with an optimistic byzantine agreement protocol 106 (referred to herein as optimistic protocol) that exhibits the following property in all runs:

Agreement: All honest parties that decide, decide on the same value.

Moreover, optimistic protocol 106 guarantees (deterministic) termination in all synchronous and eventually synchronous runs, and provides a probabilistic termination in asynchronous ones:

Termination: All honest parties eventually decide.

Probabilistic-Termination: All honest parties decide with probability 1.

As for validity, for the lower bounds, in order to strengthen them as much as possible, the present disclosure considers the binary case, which is the weakest possible definition. For the upper bounds, the present disclosure is interested in practical multi-valued protocols and thus considers the external validity property, which is implicitly or explicitly considered in most practical byzantine agreement solutions. Intuitively, with external validity, parties are allowed to decide on a value proposed by any party (honest and byzantine) as long as it is valid by some external prediction. To capture the above and rule out trivial solutions such as simply deciding on some pre-defined externally valid value, a formal definition is given below. In both validity properties, honest parties decide only on values from a set V:

Binary validity: The domain of valid values $V=\{0, 1\}$, and if all honest parties propose the same value $v \in V$, than no honest party decides on a value other than v.

External validity: The domain of valid values V is unknown to honest parties and in the beginning of every run, each honest party gets a value v with a proof a that $v \in V$ such that all other honest parties can verify.

Cryptographic Assumptions

Parties 102 running optimistic protocol 106 perform cryptographic operations. As noted above, for discussion purposes, we can assume a computationally bounded adversary 14. Further for discussion purposes and in order to avoid considering security parameters and negligible error probabilities, we assume that the following cryptographic tools are perfect:

Authenticated link. If an honest party $p_i$ delivers a message m from an honest party $p_j$, then $p_j$ previously sent m to $p_i$.

Threshold signatures scheme. We assume that each party $p_i$ has a private function SHARE-SIGN$_i$, and we assume 3 public functions SHARE-VALIDATE, THRESHOLD-SIGN, and THRESHOLD-VALIDATE. Informally, given "enough" valid shares, the function THRESHOLD-SIGN returns a valid threshold signature. For our algorithm, we sometimes require "enough" to be t+1 and sometimes n–t.

System 100 includes a global clock 12 that is visible to all parties 102. For discussion purposes global clock 12 can be deemed to perfectly measure time. Communication links between parties 102 can be deemed reliable but controlled by adversary 14, i.e., all messages 104 sent among honest parties are eventually delivered, but the adversary controls the delivery time. A run of a protocol is deemed eventually synchronous if there is a global stabilization time (GST) after which all messages 104 sent among honest parties are delivered within a time Δ. A run is deemed synchronous if GST occurs at time 0, and asynchronous if GST never occurs.

Each party 102 runs optimistic protocol 106. The optimistic protocol includes a synchronous protocol component 122, an asynchronous protocol component 126, and a transition component 124. In some embodiments, the optimistic protocol components 122, 126 invoke multiple instances of a linear leader-based view (linear LBV) building block, each instance of which being parametrized with a sequence number and a leader.

Each party 102 running the optimistic protocol maintains a local state 128, which is used by all LBV instances and is updated according to their returned values. For every possible sequence number sq, LEADER stores the party that is chosen (a priori or in retrospect) to be the leader associated with LBV instance sq. The COMMIT variable is a tuple that consists of a value val, a sequence number sq where val was committed in the linear LBV that is parametrized with sq and LEADER, and a threshold signature (a binary sequence {0,1}*) that is used as a proof of it. The VALUE variable contains a safe value to propose and the KEY variable is used as to prove that VALUE is indeed safe. KEY contains a sequence number sq and a threshold signature (the proof) that proves that no value other than VALUE could be committed in the linear LBV that is parametrized with sq and LEADER. The LOCK variable stores a sequence number sq, which is used to determine what keys are up-to-date and what are obsolete—a key is "up-to-date" if it contains a sequence number that is greater than or equal to LOCK.

Linear Leader-Based View (LBV) Building Block

Figure 2:
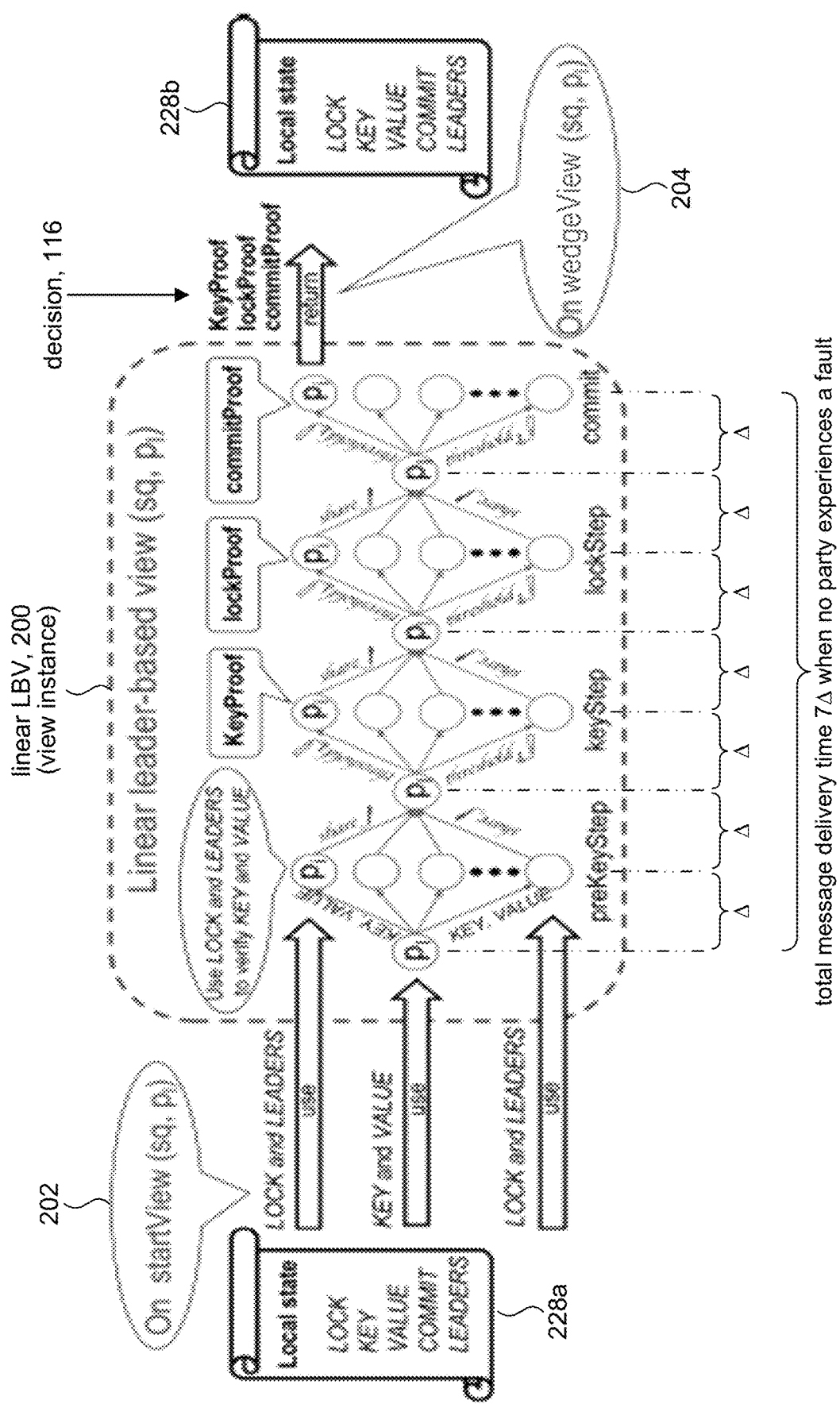
FIG. 2 shows a linear leader based view (linear LBV) in accordance with the present disclosure.

FIG. 2 shows an illustration of a linear LBV building block 200 in accordance with the present disclosure. As mentioned above and explained in more detail below, each party 102 instantiates instances of linear LBV 200 to run the synchronous component 122 and the asynchronous component 124 of optimistic protocol 106.

An instance of linear LBV 200 is instantiated by a party by invoking at 202 an application programming interface API (STARTVIEW FIG. 3) that is parameterized by sq and $p_l$, where sq represents the linear LBV instance and $p_l$ identifies the leader party of the instance (e.g., STARTVIEW(⟨sq, $p_l$⟩)). The LBV instance uses the initial state 228a of the party's local state information. The LBV instance returns decision 116 comprising KEYPROOF, LOCKPROOF, and COMMITPROOF variables to update the local state 228b when a commit message is received from the leader or when a WEDGEVIEW API (e.g., WEDGEVIEW(⟨sq,$p_l$⟩)), is invoked at 204.

FIGS. 3 and 4 provide detailed pseudocode of processing by each party 102 in an invocation of a linear LBV. As explained below, each party invokes the STARTVIEW procedure and the WEDGEVIEW procedure. Each party in turn responds to an invocation of STARTVIEW and WEDGEVIEW. FIG. 3 shows the pseudocode for processing by a party $p_i$ in response to an invocation of STARTVIEW and WEDGEVIEW.

Upon a STARTVIEW(⟨sq, $p_l$⟩) invocation, the invoking party (whether or not the leader) starts processing (at line 5) received messages associated with the linear LBV that is parametrized with sequence number sq and a leader $p_l$ according to procedures in the pseudocode set forth in FIG. 4. When the invoking party is not the leader, it waits for its done control primitive to become TRUE (at line 21 in pseudocode in FIG. 3), while processing messages, before returning from the STARTVIEW invocation.

When the invoking party is the leader $p_l$, it also performs leader-to-all and all-to-leader communications in steps 302, 304, 306, 308 of the pseudocode in FIG. 3 in addition to messages associated with the linear LBV that is parametrized with sequence number sq and a leader pt. In each of the first 3 steps 302, 304, 306 in FIG. 3, the leader sends a message to all parties (including itself) that includes its VALUE and a threshold signature (KEY) that proves the safety of the value for the current step and then waits to collect n–f valid replies. Each party (including the leader) that receives a message from the leader validates (steps 402, 404, 406, FIG. 4) that the value and proof in the received message are valid for the current step, then produces its signature share (ρ) on a message that contains the value and the current step's name, and sends the share ρ back to the leader. When the leader gets n–t valid shares (steps 402a, 404a, 406a), it combines them (steps 302a, 304a, 306a) into a threshold signature and continues to the next step. After successfully generating the threshold signature at the end of the third step (306), the leader has a commit certificate (vc) which it sends (broadcasts) a message together with its VALUE to all parties (308), including itself. The leader then waits for its done control primitive to become TRUE (at line 21 in pseudocode in FIG. 3).

In addition to validating and share signing messages (steps 402, 404, 406), parties store the values and proofs they receive (steps 404, 406, 408). The KEYPROOF and LOCKPROOF variables (steps 4040, 406) store a tuple consisting of the value and the threshold signature received from the leader in the second and third steps (302, 304), respectively, and COMMITPROOF (step 408) stores the received value and the commit certificate from the leader in step 308.

When a party (including the leader) receives a valid commit certificate from the leader it sets its done control primitive to TRUE (step 408). This allows the invoking party to terminate (at line 21 in pseudocode in FIG. 3) and return the KEYPROOF, LOCKPROOF, and COMMITPROOF variables (step 310) so that the high level agreement protocol (e.g., components 122, 126, FIG. 1) can update the LOCK, KEY, VALUE, and COMMIT variables in the party's local state.

Regarding the validation of the leader's messages, parties distinguish between the first message (step 302) from the rest (steps 304, 306, 308). In response to messages from steps 304, 306, 308, parties simply check (steps 404, 406, 408) that the attached proof is a valid threshold signature on a message that contains the leader's value and the previous step name of the current linear LBV instance.

The first message from step 302, however, is treated differently. The first message is what links sequentially composed LBV instances. To develop an intuition about this, let us first present the properties guaranteed by a single linear LBV instance:

Commit causality: If a party gets a valid commit certificate, then at least t+1 honest parties previously got a valid LOCKPROOF.

Lock causality: If a party gets a valid LOCKPROOF, then at least t+1 honest parties previously got a valid KEYPROOF.

Safety: All valid KEYPROOF, LOCKPROOF, and commit certificates obtained in the LBV instance have the same value.

The validation in the step 302 (first step) makes sure that the leader's value satisfies the safety properties of the high-level byzantine agreement protocol (e.g., components 122, 126, FIG. 1) that sequentially composes and operates several linear LBVs. The leader's message in the first step contains its VALUE and KEY, where KEY stores the last (non-empty) KEYPROOF returned by a previous linear LBV instance together with the LBV's sequence number. When a party gets the message from the first step the message is processed according to step 402. In step 402, the party first validates, e.g., by checking the key's sequence number sq, that the attached key was obtained in an LBV instance that does not precede the instance that the party is locked on (i.e., the sequence number that is stored in the party's LOCK variable). Then, the party checks that the threshold signature (ρ) in the key is a valid signature (1) on a message that contains the leader's value; and (2) was generated at the end of the first step (a valid KEYPROOF) of the LBV instance that is parametrized with sq and LEADER. Note that if the party is not locked (LOCK=1) then a key is not required.

In order to be able to abandon an LBV instance with a byzantine leader that does not drive progress, parties use the WEDGEVIEW API (FIG. 3), which returns the current values of KEYPROOF, LOCKPROOF, and COMMITPROOF. Moreover, as mentioned below, to ensure the LBVs' causality guarantees are propagated to each party's KEY, LOCK, and COMMIT variables, which are updated with the returned values, parties stop participating by ignoring all messages once WEDGEVIEW(⟨sq, leader⟩) is invoked. This aspect of the present disclosure discussed below.

With respect to communication complexity, note that the number of messages sent among honest parties in an LBV instance is O(n)≅O(t). In addition, since signatures are not accumulated—leaders use threshold signatures—each massage contains a constant number of words, and thus the total communication cost of an LBV instance is O(t) words.

The synchronous and the asynchronous components 122, 126 of the optimistic protocol 106 use different approaches with the above-described linear LBV, but in the end they both sequentially compose LBVs. The synchronous component 122 of the optimistic protocol 106 determines the composition of LBV's in advance, whereas the asynchronous component 126 chooses what instances are part of the composition of LBV's in retrospect.

A "sequential composition" of LBVs operates as follows: parties start an LBV instance by invoking STARTVIEW and at some later time may invoke WEDGEVIEW and update their local states with the returned values. Then, they exchange messages to propagate information (e.g., up-to-date keys or commit certificates), update their local states again and start the next LBV. A high-level agreement protocol that sequentially composes several linear LBV instances and maintains the local state information 128 has the following properties:

Agreement: all commit certificates in all LBV instances have the same value.

Conditional progress: for every LBV instance, if the leader is honest, all honest parties invoke startView, and all messages among honest parties are delivered before some honest party invokes wedgeView, then all honest parties get a commit certificate.

Intuitively, by the commit causality property, if some party returns a valid commit certificate (COMMITPROOF) with a value v in some LBV instance with sequence number sq, then at least t+1 honest parties return a valid LOCKPROOF and thus lock on sq (LOCK←sq). Therefore, since the leader of the next LBV needs the cooperation of n−t parties in order to generate threshold signatures, its first step's message must include a valid KEYPROOF that was obtained in the LBV instance with sequence number sq. By the safety property of the linear LBV, this KEYPROOF includes the value v and thus v is the only value the leader can propose. The agreement property follows by induction.

As for conditional progress, we have to make sure that honest leaders are able to drive progress. Thus, we must ensure that all honest leaders have the most up-to-date keys. By the lock causality property, if some party gets a valid LOCKPROOF in some LBV, then at least t+1 honest parties get a valid KEYPROOF in this LBV and thus are able to unlock all honest parties in the next LBV. Therefore, leaders can get the up-to-date key by querying a quorum of n−t parties.

The discussion will now turn to a description of using linear LBVs described above to implement the synchronous component 122 and asynchronous component 126 of optimistic protocol 106.

Synchronous Component 122

Figure 5:
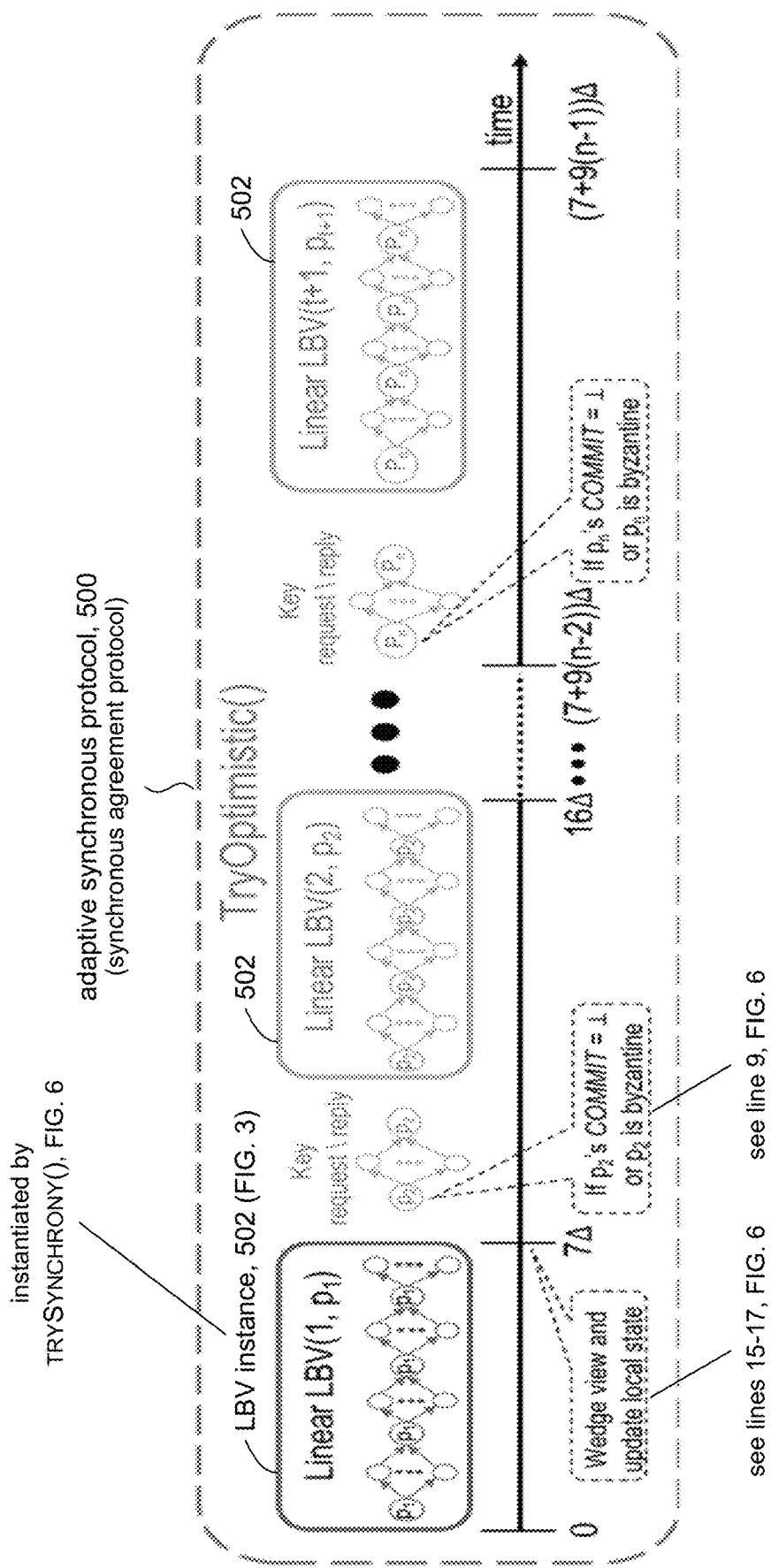
FIG. 5 shows a synchronous protocol that uses linear LBVs in accordance with the present disclosure.

FIG. 5 shows an adaptive synchronous protocol 500 (synchronous agreement protocol) that can be used as synchronous component 122 of optimistic protocol 106. Synchronous protocol 500 is based on a sequential composition of linear LBVs 502.

FIGS. 6 and 7 provide detailed pseudocode of processing by each party 102 to run synchronous protocol 500. The procedure SYNCH-PROPOSE($v_i$) is a driver that is invoked by party $p_i$ to initiate a run of synchronous protocol 500 to decide on a value $v_i$ proposed by party $p_i$. The procedure TRYOPTIMISTIC( ) is the engine that runs synchronous protocol 500. This engine can be used in an embodiment of the synchronous component 122 of optimistic protocol 106.

Party $p_i$ running synchronous protocol 500 sequentially composes n pre-defined linear LBV instances 502. Party $p_i$ instantiates the first LBV at line 5 in the pseudocode in FIG. 6 with leader $p_i$. As described above, parties in an LBV instance "decide" whenever they get a commit certificate in one of them. To exploit synchrony, parties in the optimistic protocol use the shared global clock to coordinate their actions—meaning that all STARTVIEW and WEDGEVIEW invocation times are predefined in a way that allows honest leaders to provide conditional progress, e.g., the first LBV starts at time 0 and is wedged at time 7Δ (see FIG. 2, the total time for an LBV); see lines 5 and 15 in the pseudocode in FIG. 6, for example. In addition, to make sure honest leaders can drive progress, each leader (except the first) learns the up-to-date key, before invoking STARTVIEW to instantiate the next LBV instance by querying all parties and waiting for a quorum of n−t parties to reply.

Composing n LBV instances may lead in the worst case to $O(t^2)$ communication complexity−O(t) for every LBV instance. Therefore, to achieve the optimal adaptive complexity, honest leaders in our protocol participate (i.e., learn the up-to-date key and invoke STARTVIEW) only in case they have not yet decided; see line 9 in the pseudocode in FIG. 6. Note that the communication cost of an LBV instance in which the leader does not invoke STARTVIEW is 0 because other parties only reply to the leader's messages. If the leader of the second LBV instance is honest and had committed a value in the first instance (its COMMIT≠⊥ at time 7Δ), then no message is sent among honest parties between time 7Δ and time 16Δ (see FIG. 5).

Termination and communication complexity. A naive approach to guarantee termination and avoid an infinite number of LBV instances in a leader based byzantine agreement protocols is to perform a costly communication phase after each LBV instance. One common approach is to reliably broadcast commit certificates before halting, while a complementary one is to halt unless receiving a quorum of complaints from parties that did not decide. In both cases, the communication cost is $O(t^2)$ even in runs with at most one failure.

A novel aspect of optimistic protocol 106 is to exploit synchrony in order to allow honest parties to learn the decision value and at the same time help others in a small number of messages. Instead of complaining (together) after every not successful LBV instance, each party has its own pre-defined time to "complain", in which it learns the up-to-date key and value, and helps others decide via the LBV instance in which it acts as the leader.

By the conditional progress property and the synchrony assumption, all honest parties get a commit certificate in LBV instances with honest leaders. Therefore, the termination property is guaranteed since every honest party has its own pre-defined LBV instance, which it invokes in case it has not yet decided (at line 9 in the pseudocode in FIG. 6). As for the optimistic protocol's total communication cost, recall that the LBV's communication cost is $O(t)$ in the worst case and 0 in case the leader is honest that decides not to participate since it has already decided. In addition, since all honest parties get a commit certificate in the first LBV instance with an honest leader, we get that the message cost of all later LBV instances with honest leaders is 0. Therefore, the total communication cost of the optimistic protocol is $O((f+1)t) \cong O(f\ t)$ words—at most f LBVs with byzantine leaders and 1 LBV with an honest one that cost $O(t)$ words each.

Asynchronous Component 126

Figure 8:
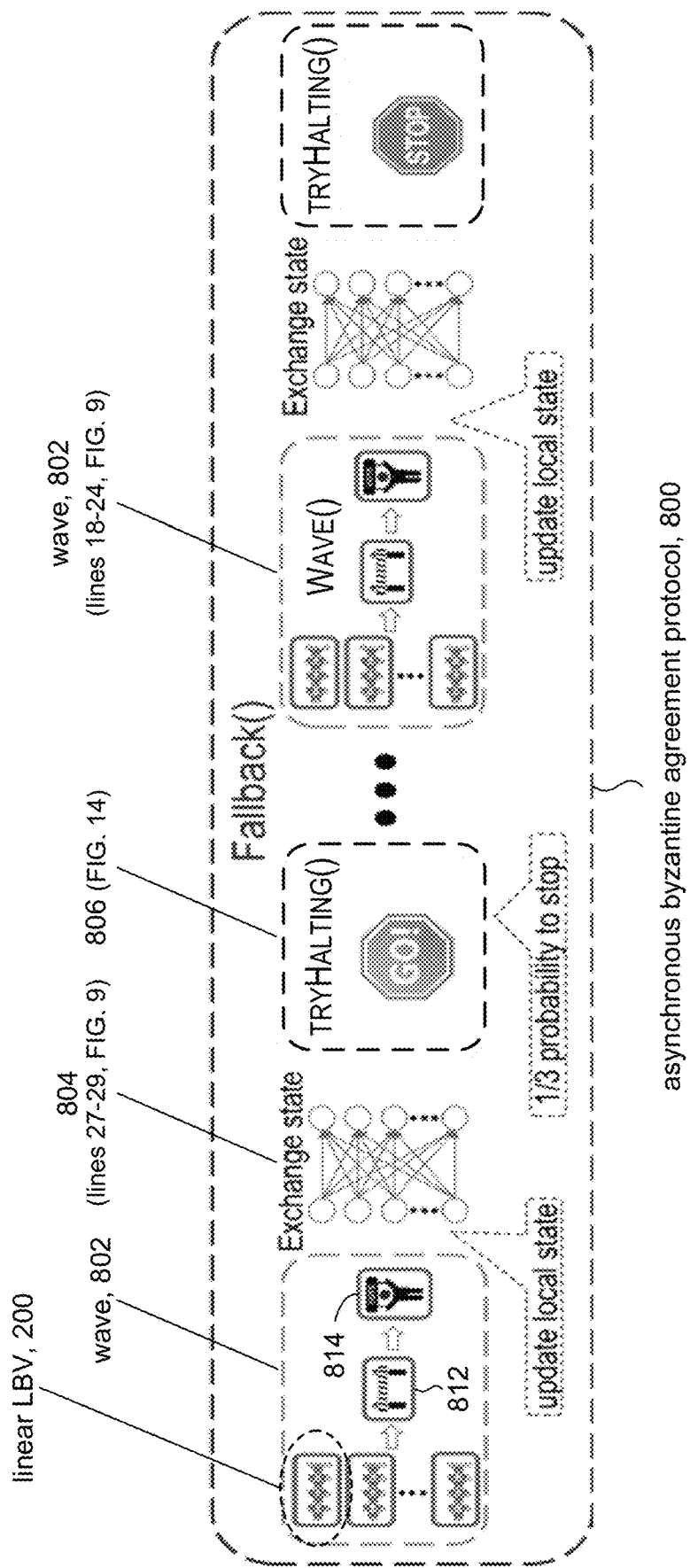
FIG. 8 shows an asynchronous protocol that uses linear LBVs in accordance with the present disclosure.

FIG. 8 shows the use of the linear LBV building block 200 in an asynchronous byzantine agreement protocol 800 that can be adapted as asynchronous component 126 of optimistic protocol 106. The asynchronous byzantine agreement protocol 800 comprises a series of runs called waves 802. Between consecutive waves 802 is an exchange phase 804 followed by an invocation to a HELP&TRYHALTING procedure 806.

Instead of having a pre-defined leader in every round, the asynchronous byzantine agreement protocol 800 lets n leaders operate n respective LBVs concurrently and then randomly chooses one in retrospect; e.g., FIG. 10, line 23 provides a pseudo-random mechanism for electing a new leader $p_j$. This mechanism is implemented inside a wave 802, and the agreement protocol operates in a wave-by-wave manner such that in between every two consecutive waves parties exchange 804 their local states and try halting 806 by king the HELP&TRYHALTING procedure. This is illustrated in lines 6-10 and 15 in FIG. 9.

FIGS. 9 and 10 provide detailed pseudocode of processing by each party 102 to run asynchronous byzantine agreement protocol 800. The procedure ASYNCH-PROPOSE($v_i$) in FIG. 9 is a driver that is invoked by party $p_i$ to initiate a run of asynchronous byzantine agreement protocol 800 to decide on a value $v_i$ proposed by party $p_i$. The procedure FALLBACK ( ) is the engine that runs asynchronous byzantine agreement protocol 800. This engine can be used in an embodiment of the asynchronous component 126 of optimistic protocol 106. To implement the wave mechanism depicted in FIG. 8, two auxiliary primitives (FIG. 10) are defined to support the sequence of LBV instantiations: ELECT( ) to provide Leader election 814 within a wave 802 and BARRIER-SYNC( ) to provide Barrier synchronization (blocking) 812 between waves 802.

Figure 11:
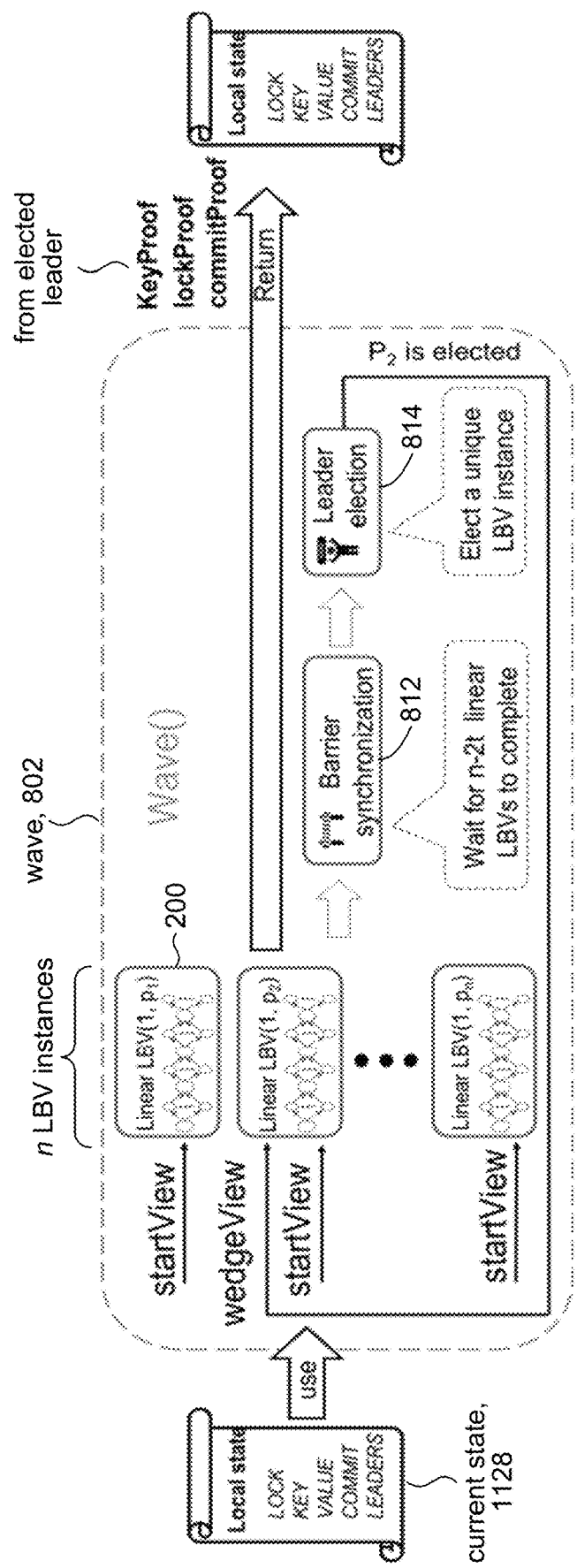
FIG. 11 shows details of a wave in accordance with the present disclosure.

FIG. 11 shows details of a wave 802 in a run of asynchronous byzantine agreement protocol 800 keeping in mind that the protocol is run by each party $p_i$. At the beginning of every wave 802, party $p_i$ invokes, via STARTVIEW, n concurrent LBV instances (lines 19-20 in the pseudocode in FIG. 9), each with a different leader, using the party's respective current local state information 1128. Then party $p_i$ blocks in the BARRIER-SYNC( ) primitive 812 until at least n−2t LBV instances complete (at line 21 in the pseudocode in FIG. 9). The pseudocode 1002 in FIG. 10 for the BARRIER-SYNC( ) primitive shows that the primitive waits for the READY control primitive to become TRUE. As explained above, an LBV completes when t+1 honest parties get a commit certificate. When an instance of an LBV completes it sends a YOUR-VIEW-DONE message to the LBV leader (pseudocode 902, FIG. 9). At pseudocode 904, when n−t such messages are received by party $p_i$, this triggers the sequence of procedures 1004, 1006, 1008. At 1008, the READY control primitive becomes TRUE, so that the BARRIER-SYNC ( ) primitive at line 21 in the pseudocode in FIG. 9 unblocks. Party $p_i$ then uses the ELECT( ) primitive 814 to elect a unique LBV instance, wedges the elected leader (via WEDGEVIEW( )), and ignores the rest (lines 22-24 in the pseudocode in FIG. 9).

As shown in FIG. 8, parties choose a completed LBV with a probability of 1/3, which guarantees that after the state exchange phase 804 all honest parties get a commit certificate, decide, and halt (STOP) in the HELP&TRYHALTING procedure. Otherwise, parties update their local state and continue (GO) from the HELP&TRYHALTING procedure the to the next wave.

Since every wave has a probability of 1/3 to choose a completed LBV instance, the optimistic protocol guarantees probabilistic termination—in expectation, all honest parties decide after 3 waves. In order to also satisfy standard termination in eventually synchronous runs, we "try synchrony" after each not successful wave. See lines 5 and 11-15 in FIG. 9. Between every two consecutive waves, parties deterministically try to commit a value in a predefined LBV instance. The preceding HELP&TRYHALTING procedure guarantees that after GST all honest parties invoke STARTVIEW in the pre-defined LBV instance with at most 1Δ from each other and thus setting a timeout to 8Δ is enough for an honest leader to drive progress. We describe the HELP&TRYHALTING procedure below.

Communication complexity. The communication cost of the Barrier and Leader-election primitives, as well as that of n LBV instances, is $O(n^2)$, which brings us to a total of O(n2) cost for every wave. Since every wave have a probability of 1/3 to choose a completed LBV, the optimistic protocol operates 3 waves in expectation. Therefore, since the communication cost of state exchange and help&tryHalting is $O(n^2)$ as well, we get that the total cost, in expectation, is $O(n^2)$ words.

Optimistic Byzantine Agreement Protocol 106

Figures 12A, 12B:
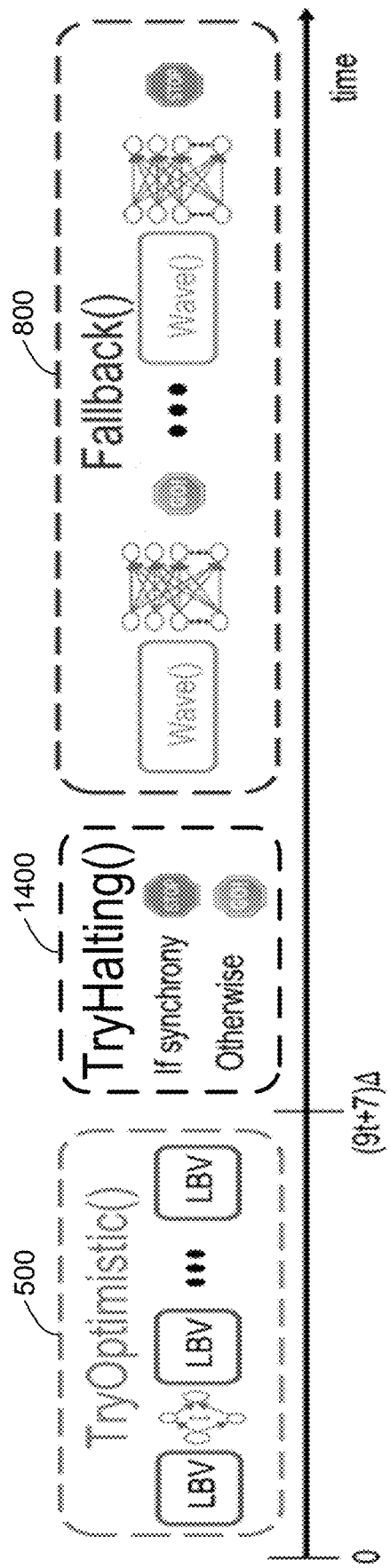
FIG. 12A shows an optimistic byzantine agreement protocol in accordance with the present disclosure.
FIG. 12B shows a driver for an optimistic byzantine agreement protocol in accordance with the present disclosure.

In this section we combine the synchronous protocol 500 (FIG. 5) described above with the asynchronous protocol 800 (FIG. 8) described above to arrive at the optimistic byzantine agreement protocol 106 of the present disclosure. Referring to FIGS. 12A and 12B, in a high level, the optimistic byzantine agreement protocol operates with each party $p_i$ first running the synchronous protocol (described above in FIG. 5) by invoking the TRYOPTIMISTIC procedure with a proposed value. Each party then invokes the HELP&TRYHALTING procedure 1400 (described in FIG. 14), and when a decision has not been reached, continues to the asynchronous protocol (FIG. 8) by invoking the FALLBACK procedure (described above in FIG. 8).

Figure 13:
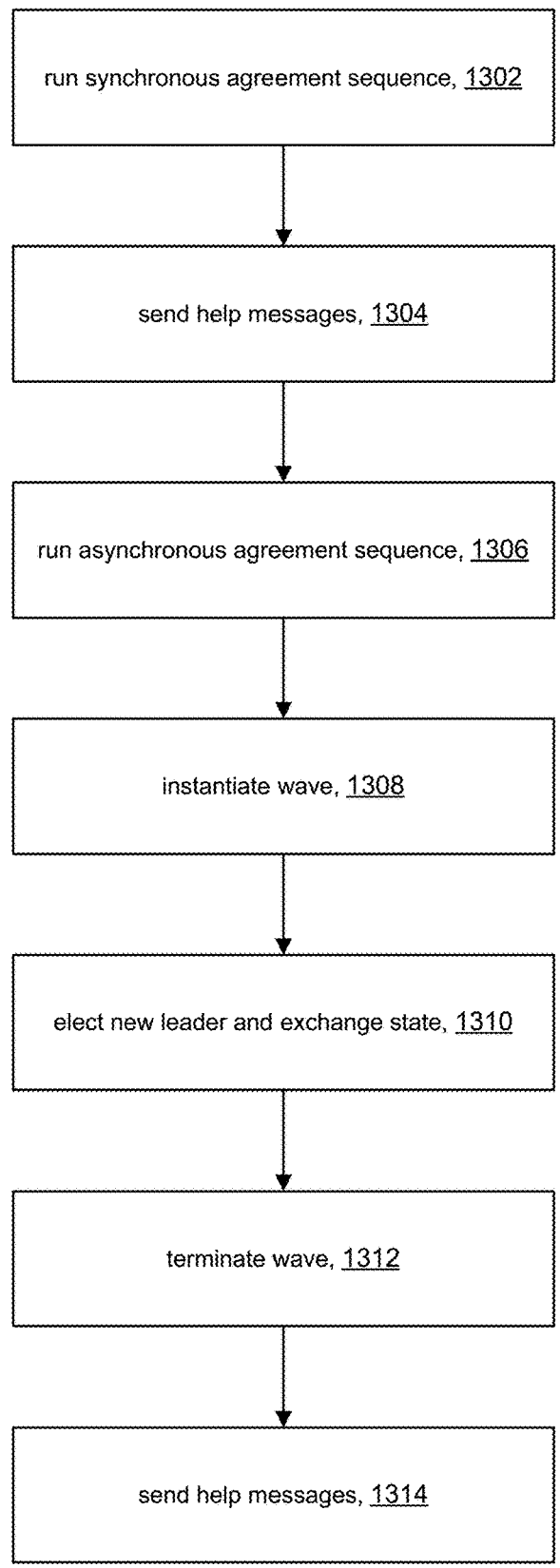
FIG. 13 shows operation of an optimistic byzantine agreement protocol in accordance with the present disclosure.

Referring to FIG. 13, the discussion will now turn to a high level description of processing by a party $p_i$ (e.g., 102) for achieving agreement among n parties (e.g., parties 102, FIG. 1) to a proposed value (114) in accordance with the present disclosure. In some embodiments, for example, party $p_i$ can include computer executable program code, which when executed by a processor (e.g., 1612, FIG. 16), can cause the processor to perform processing in accordance with FIG. 13.

At operation 1302, party $p_i$ (e.g., party P2 in FIG. 1) can run a synchronous agreement sequence on the proposed value (e.g., FIG. 12B, line 3) by instantiating, in sequential order (e.g., FIG. 6, line 6), one or more view instances (e.g., FIG. 2) using a different party among the n parties as leader for each view instance. The leader in each view instance sends a sequence of messages to all parties to commit to the proposed value (e.g., FIG. 3, lines 6-19). In accordance with the present disclosure, a view instance using a given party as leader is instantiated only when that given party has not committed to the proposed value in a previous view instance (FIG. 6, line 9).

Party $p_i$ can send a commit message to all n parties when a predetermined number of parties executing in a view instance have committed (e.g., FIG. 3, lines 17, 20).

Party $p_i$ can terminate a view instance after a predetermined amount of time has passed (e.g., FIG. 6, line 16) and instantiate a next view instance (e.g., FIG. 6, line 6). For example, the predetermined amount of time is equal to an amount of time to complete a view instance when none of the n parties experiences a fault (e.g., 7Δ, FIG. 2).

At operation 1304, party $p_i$ can send a help message to all n parties when party $p_i$ has not committed to the proposed value in a previous view instance (e.g., FIG. 12B, line 4, which invokes a HELP&TRYHALTING procedure in FIG. 14). Referring to FIG. 14, we see that party $p_i$ will send a HELPREQUEST message when $p_i$ has not committed.

At operation 1306, party $p_i$ can run an asynchronous agreement sequence on the proposed value (e.g., FIG. 12B, line 5) when a predetermined number of parties among the n parties have sent a help message (e.g., FIG. 14, line 15). Setting HALT to FALSE will cause party $p_i$ to return from the HELP&TRYHALTING procedure at line 5, which will invoke the FALLBACK procedure in FIG. 12B, line 5.

At operation 1308, party $p_i$ can instantiate a wave (e.g., FIG. 9, line 8, 18-20, FIG. 11) comprising a plurality of concurrently executing views with a different leader for each view.

At operation 1310, when a predetermined number of executing views have completed, party $p_i$ can elect a new leader (e.g., FIG. 9, line 22) and exchange a commit state of the new leader among the n parties (e.g., FIG. 9, line 9). The new leader can be elected in a pseudo-random matter (e.g., FIG. 10, line 23).

At operation 1312, party $p_i$ can terminate execution of the wave (e.g., FIG. 9, line 23) and set its commit state to the commit state of the new leader (e.g., line 24).

At operation 1314, party $p_i$ can send a help message (e.g., FIG. 14 via FIG. 9, line 10) to all n parties when the new leader has not committed to the proposed value and instantiate the next wave (e.g., FIG. 9, line 8). Party $p_i$ can invoke the TRYSYNCHRONY procedure (FIG. 9, line 8) between waves in order to terminate in case of eventually synchronous runs.

HELP&TRYHALTING Procedure

Satisfying termination without sacrificing optimal adaptive complexity is a non-trivial challenge. Parties start the optimistic protocol by optimistically trying the synchronous part, but at the end of the synchronous part they cannot distinguish between the case in which the communication was indeed synchronous and all honest parties decided and the case in which some honest parties did not decide due to asynchrony. Moreover, honest parties cannot distinguish between honest parties that did not decide and thus wish to continue to the asynchronous fallback part and byzantine parties that want to move to the fallback part in order to increase the communication cost.

To this end, we implement a HELP&TRYHALTING procedure 1400 (FIG. 14), which stops honest parties from moving to the fallback part in synchronous runs, with a communication cost of O(ft) words. The idea is to help parties learn the decision value and move to the fallback part only when the number of help request indicates that the run is asynchronous.

The pseudocode of HELP&TRYHALTING is given in FIG. 14 and illustrated in FIGS. 15A and 15B. Each honest party that has not yet decided sends a signed HELPREQEST to all other parties (step 1402) by invoking HELP&TRYHALTING. When an honest party gets a HELPREQEST, the party replies (step 1404) with its COMMIT value in a HELPREPLY message, and if it gets t+1 HELPREQEST messages, the party combines them to a threshold signature and sends it in a complain message to all other parties (step 1406). When an honest party gets a complain message, it echoes (step 1408) it to all parties and continues to the fallback part. FIG. 15A illustrates an example of just one party $p_0$ (i.e., less than t+1 parties) sending a HELPREQEST message to all parties. The parties send their respective COMMIT values in respective HELPREPLY messages to all parties; this is the "help" that each party tries to give other parties. FIG. 15B illustrates an example of at least t+1 parties sending HELPREQEST messages to all parties. In addition to the parties sending their respective COMMIT values, they also send a COMPLAIN message (the "complaint") in response to receiving at least t+1 HELPREQEST messages.

Termination. Consider two cases. Case 1: The parties move to the fallback part, in which case (standard) termination is guaranteed in eventually synchronous runs and probabilistic termination is guaranteed in asynchronous runs. Case 2: Less than t+1 parties send HELPREQEST in the HELP&TRYHALTING procedure, which implies that at least t+1 honest parties decided and had a commit certificate before invoking HELP&TRYHALTING. Therefore, all honest parties that did not decide before invoking HELP&TRYHALTING eventually get a help reply message with a commit certificate and decide as well.

Communication complexity. The synchronous (optimistic) part guarantees that if the run is indeed synchronous, then all honest parties decide before invoking the HELP&TRYHALTING procedure. The HELP&TRYHALTING procedure guarantees that parties continue to the fallback part only if t+1 parties send a HELPREQEST message, which implies that they move only if at least one honest party has not decided in the synchronous part. Therefore, together they guarantee that honest parties never move to the fallback part in synchronous runs.

The communication complexity of the synchronous part is O(ft), so in order to show that the optimistic protocol's communication complexity in synchronous runs is O(ft) we need to show that the cost of HELP&TRYHALTING is O(ft) as well. Since in synchronous runs all honest parties decide in the synchronous part, they do not send HELPREQEST messages, and thus no party can send a valid complain message. Each byzantine party that does send a HELPREQEST message can cause honest parties to send O(t) replies, which brings us to a total communication cost of O(ft) in synchronous runs.

As for all other runs, we noted above that deterministic protocols have an unbounded communication cost in the worst case. However, due to the randomized fallback, our protocol has an expected communication cost of $O(t^2)$.

Figure 16:
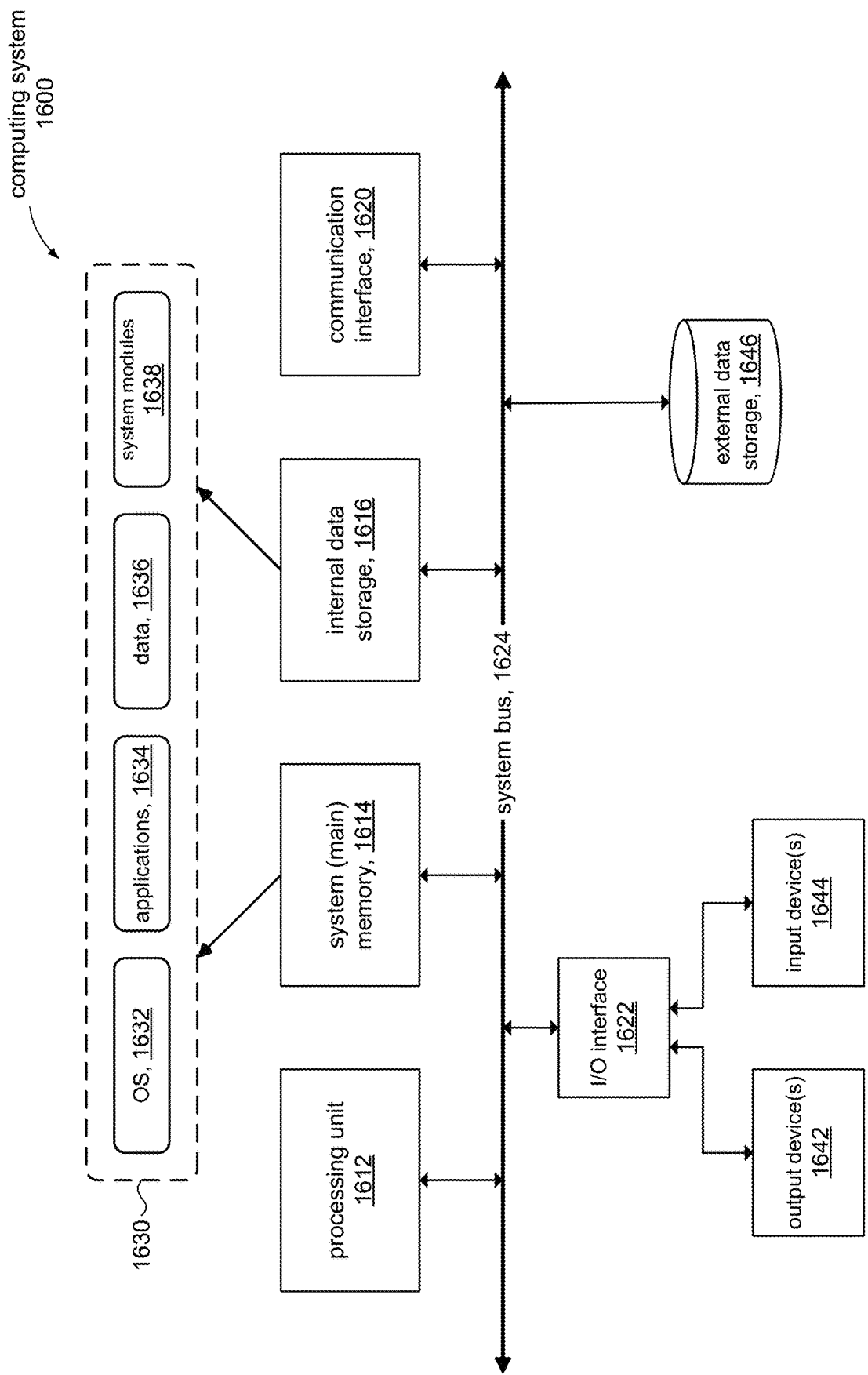
FIG. 16 shows a computing system in accordance with the present disclosure.

FIG. 16 is a simplified block diagram of an illustrative computing system 1600 for implementing one or more of the embodiments described herein (e.g., party 102, FIG. 1). The first computing system 1600 can perform and/or be a means for performing, either alone or in combination with other elements, operations in accordance with the present disclosure. Computing system 1600 can also perform and/or be a means for performing any other steps, methods, or processes described herein.

Computing system 1600 can include any single- or multi-processor computing device or system capable of executing computer-readable instructions. Examples of computing system 1600 include, for example, workstations, laptops, servers, distributed computing systems, and the like. In a basic configuration, computing system 1600 can include at least one processing unit 1612 and a system (main) memory 1614.

Processing unit 1612 can comprise any type or form of processing unit capable of processing data or interpreting and executing instructions. The processing unit 1612 can be a single processor configuration in some embodiments, and in other embodiments can be a multi-processor architecture comprising one or more computer processors. In some embodiments, processing unit 1612 can receive instructions from program and data modules 1630. These instructions can cause processing unit 1612 to perform operations in accordance with the various disclosed embodiments of the present disclosure.

System memory 1614 (sometimes referred to as main memory) can be any type or form of storage device or storage medium capable of storing data and/or other computer-readable instructions, and comprises volatile memory and/or non-volatile memory. Examples of system memory 1614 include any suitable byte-addressable memory, for example, random access memory (RAM), read only memory (ROM), flash memory, or any other similar memory architecture. Although not required, in some embodiments computing system 1600 can include both a volatile memory unit (e.g., system memory 1614) and a non-volatile storage device (e.g., data storage 1616, 1646).

In some embodiments, computing system 1600 can include one or more components or elements in addition to processing unit 1612 and system memory 1614. For example, as illustrated in FIG. 16, computing system 1600 can include internal data storage 1616, a communication interface 1620, and an I/O interface 1622 interconnected via a system bus 1624. System bus 1624 can include any type or form of infrastructure capable of facilitating communication between one or more components comprising computing system 1600. Examples of system bus 1624 include, for example, a communication bus (such as an ISA, PCI, PCIe, or similar bus) and a network.

Internal data storage 1616 can comprise non-transitory computer-readable storage media to provide nonvolatile storage of data, data structures, computer-executable instructions, and so forth to operate computing system 1600 in accordance with the present disclosure. For instance, the internal data storage 1616 can store various program and data modules 1630, including for example, operating system 1632, one or more application programs 1634, program data 1636, and other program/system modules 1638 to implement structures comprising buffer tree 106 and to support and perform various processing and operations disclosed herein.

Communication interface 1620 can include any type or form of communication device or adapter capable of facilitating communication between computing system 1600 and one or more additional devices. For example, in some embodiments communication interface 1620 can facilitate communication between computing system 1600 and a private or public network including additional computing systems. Examples of communication interface 1620 include, for example, a wired network interface (such as a network interface card), a wireless network interface (such as a wireless network interface card), a modem, and any other suitable interface.

In some embodiments, communication interface 1620 can also represent a host adapter configured to facilitate communication between computing system 1600 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 1600 can also include at least one output device 1642 (e.g., a display) coupled to system bus 1624 via I/O interface 1622, for example, to provide access to an administrator. The output device 1642 can include any type or form of device capable of visual and/or audio presentation of information received from I/O interface 1622.

Computing system 1600 can also include at least one input device 1644 coupled to system bus 1624 via I/O interface 1622, e.g., for administrator access. Input device 1644 can include any type or form of input device capable of providing input, either computer or human generated, to computing system 1600. Examples of input device 1644 include, for example, a keyboard, a pointing device, a speech recognition device, or any other input device.

Computing system 1600 can also include external data storage subsystem 1646 coupled to system bus 1624. In some embodiments, the external data storage 1646 can be accessed via communication interface 1620. External data storage 1646 can be a storage subsystem comprising a storage area network (SAN), network attached storage (NAS), virtual SAN (VSAN), and the like. External data storage 1646 can comprise any type or form of block storage device or medium capable of storing data and/or other computer-readable instructions. For example, external data storage 1646 can be a magnetic disk drive (e.g., a so-called hard drive), a solid state drive, a floppy disk drive, a magnetic tape drive, an optical disk drive, a flash drive, or the like. In some embodiments, block storage subsystem 104 in FIG. 1 can comprise external data storage subsystem 1646.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A non-transitory computer-readable storage medium having stored thereon computer executable instructions executable by each party $p_i$ among n parties for reaching agreement on a proposed value via an instance of a Byzantine agreement protocol, the computer executable instructions causing party $p_i$ to:
   run a synchronous agreement sequence of the instance of the Byzantine agreement protocol on the proposed value by instantiating, in sequential order, one or more view instances using a different party among the n parties as leader for each view instance, wherein the leader in a view instance sends a sequence of messages to all n parties to commit to the proposed value;
   send a help message to all n parties when party $p_i$ has not committed to the proposed value in a previous view instance in the one or more view instances, the help message being a request to each of the n parties to return a help reply message that includes a commit certificate indicating that said each party committed to the proposed value in the previous view instance;
   upon receiving help reply messages from at least a predetermined number of the n parties, commit to the proposed value and halt the instance of the Byzantine agreement protocol; and
   upon receiving help messages from at least the predetermined number of the n parties, transition from running the synchronous agreement sequence to running an asynchronous agreement sequence of the instance of the Byzantine agreement protocol on the proposed value, the running of the asynchronous agreement sequence comprising:
      instantiating a wave comprising a plurality of concurrently executing views with a different leader for each view; and
      when a predetermined number of executing views have completed:
         electing a new leader from among the n parties; and
         exchanging a commit state of the new leader among the n parties.

2. The non-transitory computer-readable storage medium of claim 1, wherein the computer executable instructions, which when executed by party $p_i$, further cause the party $p_i$ to send a commit message to all n parties when a predetermined number of parties executing in a view instance have committed.

3. The non-transitory computer-readable storage medium of claim 1, wherein the computer executable instructions, which when executed by party $p_i$, further cause the party $p_i$ to terminate a view instance after a predetermined amount of time has passed and instantiating a next view instance.

4. The non-transitory computer-readable storage medium of claim 3, wherein the predetermined amount of time is equal to an amount of time to complete a view instance when none of the n parties experience a fault.

5. The non-transitory computer-readable storage medium of claim 1, wherein the new leader is elected in a pseudo-random manner.

6. The non-transitory computer-readable storage medium of claim 1, wherein the computer executable instructions, which when executed by party $p_i$, further cause the party $p_i$ to terminate execution of the wave and set its commit state to the commit state of the new leader.

7. The non-transitory computer-readable storage medium of claim 6, wherein the computer executable instructions, which when executed by party $p_i$, further cause the party $p_i$ to send a help message to all parties when the new leader has not committed to the proposed value and instantiate another wave.

8. An apparatus (party $p_i$) comprising:
   one or more computer processors; and
   a computer-readable storage medium comprising instructions for controlling party $p_i$ to reach agreement among n parties to a proposed value via an instance of a Byzantine agreement protocol, wherein the instructions control party $p_i$ to:
   run a synchronous agreement sequence of the instance of the Byzantine agreement protocol on the proposed value by instantiating, in sequential order, one or more view instances using a different party among the n parties as leader for each view instance, wherein the leader in a view instance sends a sequence of messages to all n parties to commit to the proposed value;
   send a help message to all n parties when party $p_i$ has not committed to the proposed value in a previous view instance in the one or more view instances, the help message being a request to each of the n parties to return a help reply message that includes a commit certificate indicating that said each party committed to the proposed value in the previous view instance;
   upon receiving help reply messages from at least a predetermined number of the n parties, commit to the proposed value and halt the instance of the Byzantine agreement protocol; and
   upon receiving help messages from at least the predetermined number of the n parties, transition from running the synchronous agreement sequence to running an asynchronous agreement sequence of the instance of the Byzantine agreement protocol on the proposed value, the running of the asynchronous agreement sequence comprising:
      instantiating a wave comprising a plurality of concurrently executing views with a different leader for each view; and
      when a predetermined number of executing views have completed:
         electing a new leader from among the n parties; and
         exchanging a commit state of the new leader among the n parties.

9. The apparatus of claim 8, wherein the computer-readable storage medium further comprises instructions for controlling party $p_i$ to send a commit message to all n parties when a predetermined number of parties executing in a view instance have committed.

10. The apparatus of claim 8, wherein the computer-readable storage medium further comprises instructions for controlling party $p_i$ to terminate a view instance after a predetermined amount of time has passed and instantiating a next view instance.

11. The apparatus of claim 10, wherein the predetermined amount of time is equal to an amount of time to complete a view instance when none of the n parties experience a fault.

12. The apparatus of claim 8, wherein the new leader is elected in a pseudo-random manner.

13. The apparatus of claim 8, wherein the computer-readable storage medium further comprises instructions for controlling party $p_i$ to terminate execution of the wave and set its commit state to the commit state of the new leader.

14. A method for achieving agreement among a plurality of computing systems to a proposed value via an instance of a Byzantine agreement protocol, the method comprising, by a first computing system among the plurality of computing systems:

running a synchronous agreement sequence of the instance of the Byzantine agreement protocol on the proposed value by instantiating, in sequential order, one or more view instances using a different computing system among the plurality of computing systems as a leader for each view instance, wherein the leader in a view instance sends a sequence of messages to each computing system among the plurality of computing systems to commit to the proposed value;

sending a help message to each computing system among the plurality of computing systems when the first computing system has not committed to the proposed value in a previous view instance in the one or more view instances, the help message being a request to each of the plurality of computing systems to return a help reply message that includes a commit certificate indicating that said each computing system committed to the proposed value in the previous view instance;

upon receiving help reply messages from at least a predetermined number of the plurality of computing systems, committing to the proposed value and halting the instance of the Byzantine agreement protocol; and upon receiving help messages from at least the predetermined number of the plurality of computing systems, transitioning from running the synchronous agreement sequence to running an asynchronous agreement sequence of the instance of the Byzantine agreement protocol on the proposed value, the running of the asynchronous agreement sequence comprising:

instantiating a wave comprising a plurality of concurrently executing views with a different leader for each view; and when a predetermined number of executing views have completed:
electing a new leader from among the plurality of computing systems; and
exchanging a commit state of the new leader among the plurality of computing systems.

15. The method of claim 14, further comprising the first computing system sending a commit message to all the plurality of computing systems when a predetermined number of computing systems executing in a view instance have committed.

16. The method of claim 14, further comprising the first computing system terminating a view instance after a predetermined amount of time has passed and instantiating a next view instance.

17. The method of claim 16, wherein the predetermined amount of time is equal to an amount of time to complete a view instance when none of the plurality of computing system experiences a fault.

18. The method of claim 14, wherein the new leader is elected in a pseudo-random manner.

19. The method of claim 14, further comprising the first computing system terminating execution of the wave and setting its commit state to the commit state of the new leader.

20. The method of claim 19, further comprising sending a help message to all computing systems when the new leader has not committed to the proposed value and instantiating another wave.

* * * * *